United States Patent
Larsen

(10) Patent No.: US 11,466,667 B2
(45) Date of Patent: Oct. 11, 2022

(54) WIND TURBINE LIGHTNING DIAGNOSTIC APPARATUS AND LIGHTNING STROKE DIAGNOSTIC METHOD

(71) Applicant: Ørsted Wind Power A/S, Fredericia (DK)

(72) Inventor: Flemming Møller Larsen, Fredericia (DK)

(73) Assignee: Ørsted Wind Power A/S, Fredericia (DK)

( * ) Notice: Subject to any disclaimer, the term of this patent is extended or adjusted under 35 U.S.C. 154(b) by 0 days.

(21) Appl. No.: 17/525,195

(22) Filed: Nov. 12, 2021

(65) Prior Publication Data

US 2022/0154699 A1 May 19, 2022

(30) Foreign Application Priority Data

Nov. 13, 2020 (EP) ..................................... 20207662
Jul. 20, 2021 (EP) ..................................... 21186764

(51) Int. Cl.
*F03D 17/00* (2016.01)
*F03D 80/30* (2016.01)

(52) U.S. Cl.
CPC ............. *F03D 17/00* (2016.05); *F03D 80/30* (2016.05); *F05B 2260/80* (2013.01); *F05B 2270/324* (2013.01)

(58) Field of Classification Search
CPC ...... F03D 80/30; F03D 17/00; F05B 2260/80; F05B 2270/324
See application file for complete search history.

(56) References Cited

U.S. PATENT DOCUMENTS

| 8,327,710 B2 * | 12/2012 | Koste ..................... F03D 80/30 73/660 |
| 9,882,368 B2 * | 1/2018 | Mendez Hernandez .................... F03D 80/30 |
| 10,185,055 B2 | 1/2019 | Groenhagen |
| 10,767,629 B2 * | 9/2020 | Fujioka ................... F03D 7/047 |
| 2011/0265575 A1 | 11/2011 | Koste et al. |

(Continued)

FOREIGN PATENT DOCUMENTS

| EP | 2884099 A1 | 6/2015 |
| JP | 2017504786 | 2/2017 |
| WO | 2014024303 A1 | 2/2014 |

OTHER PUBLICATIONS

European Application No. 20207662.6, Extended European Search Report and Written Opinion, dated Apr. 30, 2021, 7 pages.
(Continued)

*Primary Examiner* — Topaz L. Elliott
(74) *Attorney, Agent, or Firm* — Han Santos, PLLC

(57) ABSTRACT

Wind turbine lightning stroke diagnostic apparatus for a wind turbine having conductive blades. A lightning protection system input is provided for receiving measured current data associated with a current conducted by the lightning protection system following a lightning stroke. An air pressure sensor is mounted using a mount within an internal cavity of a conducive wind turbine blade assembly. A sensor monitor monitors the measured current data and the output of the air pressure sensor for identifying a bypass lightning stroke when a measured current increase coincides with the detection of a lightning generated shockwave within the internal cavity by the air pressure sensor.

15 Claims, 2 Drawing Sheets

(56) References Cited

U.S. PATENT DOCUMENTS

| | | | |
|---|---|---|---|
| 2015/0118046 A1* | 4/2015 | Mendez Hernandez | ................... F03D 80/30 416/1 |
| 2018/0230968 A1* | 8/2018 | Fujioka | ................. F03D 7/0264 |
| 2020/0226480 A1* | 7/2020 | Johnston | ................ G06V 20/52 |

OTHER PUBLICATIONS

Japanese Application No. 2021-135355, Decision to Grant dated Sep. 7, 2021, 3 pages.

* cited by examiner

WIND TURBINE LIGHTNING DIAGNOSTIC APPARATUS AND LIGHTNING STROKE DIAGNOSTIC METHOD

This application claims priority to European Application No. 21186764.3 filed on Jul. 20, 2021 and European Application No. 20207662.6, filed on Nov. 13, 2020. The entire disclosures of the afore-mentioned patent applications are incorporated herein by reference.

The present invention concerns wind turbine lightning diagnostic apparatus and, in particular, apparatus which, when installed into a wind turbine having conductive blades, may provide diagnostic data for use in the identification of by-pass lightning strokes. The present invention also concerns a lightning stroke diagnostic method for wind turbines having conductive blades and, in particular, a method using the wind turbine lightning diagnostic apparatus for the identification of by-pass lightning strokes to conductive blades. By-pass lightning strokes are lighting strokes which are not effectively captured by the receptors of a lightning protection system, LPS.

Modern wind turbines are provided with lightning protection systems, LPS, to prevent or minimise damage due to lighting strokes. Such systems comprise conductive receptors provided on the surface of the wind turbine blades which are grounded by a down-conductor which extends through the rotor hub, nacelle, and down to the base of the tower, or the tower's foundation where applicable, to connect to ground. During a lighting strike, as a leader nears the wind turbine, an upward streamer is formed at the LPS receptor and attaches to the leader to establish a current path. This current path then produces the lightning return stroke in which a huge surge of electrical current is delivered, manifesting as a lightning flash. In this scenario, damage to the structure of the wind turbine blades is prevented or largely mitigated because the current surge is conducted through the LPS to ground.

Although the LPS will normally protect the wind turbine during direct strikes to the receptors, a monitoring system for recording information about the strength of the lightning is normally provided to record diagnostic information for determining when routine repairs and maintenance operations are needed. For example, the LPS supplier may rate their equipment up to a certain lightning current load or number of strikes, after which components may need to be checked or replaced. Historically, monitoring has been achieved by providing a magnetically sensitive lightning registration card system adjacent to the down-conductor. In the event of a lightning stroke, the current conducted through the down-conductor will induce a magnetic field that is proportional to the conducted current. This magnetic field is registered by the registration card to provide a record of lighting current in kA. However, such a registration card system has a number of shortcomings. Firstly, it relies on the registration card being physically removed to readout the current value. As such, regular site visits are therefore required to check the cards, and no remote alarm can be trigged in the event of a significant lightning stroke, which is even more costly and difficult for blades on offshore turbines. Secondly, the registration cards provide relatively crude diagnostic data. This is because they merely record the maximum current that occurred during the installed time period. As such, if a wind turbine were to be struck multiple times, the registration card will only provide a record of the largest single stroke. This can therefore provide a misleading picture of the amount of lightning a wind turbine may have been subjected to.

In an attempt to address these shortcomings, some modern lighting protection systems are fitted with sophisticated electronic monitoring apparatus which records more detailed information about the conducted down-current arising from a lightning stroke. These types of electronic lighting monitoring systems may also be interfaced with the wind turbine's SCADA (supervisory control and data acquisition) system to provide remote monitoring.

Conventional electronic lightning monitoring systems have provided improved data for assessing lightning strokes by recording information such as the number of strokes, their duration, and the specific energy they deliver. However, as with magnetic registration card systems, the recorded data are limited to parameters associated with the current measured in the down-conductor. Consequently, the recorded data may still be misleading in instances where the lightning is not captured directly by the LPS receptors.

In this connection, a so-called by-pass lightning stroke may occur in which a lightning stroke connects through the body material of the wind turbine blade assembly, rather than at the LPS receptor. That is, although the upward streamer will normally form at the LPS receptor, this is not always the case and the LPS receptor can potentially be by-passed. The issue of by-pass lightning strokes has become a particular problem with the arrival of conductive wind turbine blades. That is, as modern wind turbines have become larger, it has become common to form the blades using conductive materials, such as carbon fibre. The presence of electrically conductive elements within the matrix of the blade material therefore imparts electrically conductive properties, albeit relatively poorly. This is distinct from older wind turbine blades which were formed of insulating materials, such as fibreglass, that may subsequently have a conductive LPS receptor applied thereto. In the event of a by-pass lightning stroke, the conductive blade can be subjected to impact damage, as well as uncontrolled conduction through the blade material until the current reaches the LPS down-conductor. This can not only damage the blade assembly, but importantly the current recorded by the LPS monitoring system may appear relatively low because of the dissipation of energy over the blade material. As such, even a very significant and damaging lightning stroke may not be readily identified by conventional LPS monitoring. The issue of blade damage arising from by-pass strikes is particularly exacerbated in conductive blades because of the orientational of fibres in the blade material. For example, in the case of a carbon blade, the carbon fibres may be embedded in a matrix of epoxy, with their orientations aligned for enhancing the blade's mechanical properties. However, due to this alignment, the blades will typically be more resistive in directions transverse to the fibre orientation. This results in erratic and uneven conduction through the bade material, leading to concentrated damage zones. As such, even if a by-pass strike is suspected, it is very difficult to determine the extent to which the blade may be damaged by this.

A further by-pass stroke phenomena may also occur when a lightning stroke is captured correctly by the LPS system, but the voltage drop over the LPS down conductor cable exceeds that of the insulation capacity of the insulator between the LPS down conductor and the outer shell of the conductive blade. In such a scenario, there is electrical breakdown of the LPS cable insulator, and arcing can occur over the air gap between cable and the conductive blade surface. This can cause similar dissipation of energy over the blade material to that associated with a normal by-pass stroke, albeit that the origin is the LPS conductor itself. This again is a particular problem with conducting blades and especially those which lack equipotential connections throughout the blade length. Such equipotential connections are sometimes omitted from some blades to save costs.

In addition to the need to have accurate lighting strike information for maintaining the operation of the turbine, the above issues also have significant commercial implications. For example, it would be advantageous for a blade supplier to be able to demonstrate that a failure occurred due to a by-pass lightning strike, rather than an inherent structural defect in their product. Similarly, LPS suppliers would benefit from being able to monitor the lightning capture and conduction efficiencies of their systems, particularly in the context of support claim management. Conversely, wind turbine generator operators would benefit from having accurate diagnostic data to demonstrate, for example, that by-pass lightning strikes were not the cause of failure issues.

The present invention therefore seeks to address the above issues.

According to a first aspect of the present invention, there is provided wind turbine lightning stroke diagnostic apparatus for a wind turbine having conductive blades, the apparatus comprising: a lightning protection system input for receiving measured current data associated with a current conducted by the lightning protection system following a lightning stroke; an air pressure sensor for detecting an increase in air pressure; a mount for mounting the air pressure sensor within an internal cavity of a conductive wind turbine blade assembly; and a sensor monitor for monitoring the measured current data and an output from the air pressure sensor for identifying a bypass lightning stroke when a measured current increase coincides with the detection of a lightning generated shockwave within the internal cavity by the air pressure sensor.

In this way, a by-pass lighting stroke may be differentiated from a captured lightning stroke based on the pressure sensor and monitor being configured to detect the supersonic pressure wave generated inside the hollow interior of the conductive blade assembly by the by-pass lightning stroke. That is, in the event of a by-pass lighting stroke, the delivered current surge is conducted through the conductive blade material in an uncontrolled manner. This results in arc formations over the surfaces of the conductive blade material, or between the lightning entrance point at the conductive blade shell and the LPS down conductor. The temperature of the lightning reaches up to temperatures of 20,000 to 30,000 K. Importantly, this heating occurs extremely rapidly because the lightning stroke is a microsecond (µs) event, and shockwaves are thereby generated as a result of the extreme heating from the arc expanding the air causing pressure shock waves. On the exterior surfaces of the conductive blade, these shockwaves may quickly dissipate. However, within the internal cavity of the hollow blades, the pressure wave generated by the explosive heating effect may compromise the blade's structural integrity. With the claimed arrangement, the pressure sensor is configured to detect this pressure wave, with the senor monitor correlating the pressure measurement with a current conducted through the LPS system. This can thereby indicate that a by-pass lighting stroke has occurred. Conversely, in situations where a lightning stroke is caught by the LPS receptors, the current is passed through the down-conductor in a controlled manner, without forming arcs and the associated shockwave. Equally, the system may discount pressure changes that do not coincide with a measured current through the LPS system, such as, for instance, if an acoustic disturbance were to arise from a bird impact with the blades. Accordingly, embodiments of the invention may allow by-pass lightning strokes to be differentiated from captured lightning strokes by the sensor monitor. This may thereby provide an inexpensive apparatus for the monitoring of a relatively low probability, but high consequence by-pass lightning stroke incident. In turn, this data may be used to help to plan blade inspections and ensure the timely repair of blades to prevent consequential damage that could otherwise occur from allowing operation to continue with a damaged blade. The data may also be used by stakeholders, such as blade and LPS suppliers, to provide performance information.

The above advantages are particularly important because some territories, such as Japan, which require wind turbines to be stopped and inspected for damage following a suspected lightning strike prior to restart of the wind turbine. The additional diagnostic information provided by the concurrent recording of both measured current and pressure data allows lightning strikes that have been safely captured by the LPS to be differentiated from those by-pass strikes which may have resulted in structural damage. Furthermore, information characterising the nature of the strike may also be derived from the relative values of the recorded current and pressure data. Consequently, this may potentially allow inspection operations to be avoided or minimised where damage is unlikely to have occurred.

It will also be understood that in addition to identifying normal by-pass strokes, embodiments of the invention may also detect the pressure shockwaves arising from arcing caused by the by-pass phenomena where there is electrical breakdown of the LPS cable insulator. This breakdown results in detectable pressure signals arising from arc flash-overs inside the blade structure, such as between conductive elements that are not effectively electrically bonded. As these conductive elements become energized, the voltage levels between them and other parts may become sufficiently high to cause flashovers. Such conductive elements may include metallic down conductors or wiring, or the composite blade material, and even structural elements that are conductive or semiconductive by design or due to other reasons, such as pollution with saline water or dirt.

In embodiments, the apparatus may comprise the lightning protection system.

In embodiments, the sensor monitor comprises a datalogger. In embodiments, the sensor monitor samples the output from the air pressure sensor at a sample frequency set for identifying air pressure increases associated with a supersonic pressure wave. In this way, a sufficiently high sample rate is used so that a shockwave traveling at supersonic speeds can be detected. As such, the monitor may log pressure readings from the pressure sensor at fast enough intervals that a transient pressure increase associated with a shockwave may be recorded.

In embodiments, the sensor monitor samples the output from the air pressure sensor at a sample frequency of 800 Hz or higher and, more preferably, at 1 kHz or higher. In preferred embodiments, the sensor monitor samples the output from the air pressure sensor at a sample frequency of 10 kHz-10 MHz, and more preferably is sampled in the range of 100 kHz-1.2 MHz, or 800 kHz-1.2 MHz. In this way, the high sample frequency provides higher resolution recording of pressure variances for identifying the shockwave. In embodiments, the pressure sensor has a measuring rate of 1 kHz or higher. In preferred embodiments, the pressure sensor has a measuring rate of 10 kHz or higher, and more preferably between 10 kHz and 10 MHz. This thereby provides rapid sensor feedback.

In embodiments, the sensor monitor generates a data output representing air pressure over time for identifying the lightning generated shockwave. In this way, the monitor may provide an output for allowing the pressure changes to be plotted over time so that transient increases in pressure may be identified and correlated with measured current data from the LPS monitoring system. For example, a pressure spike indicating an arc generated shockwave may be matched to a current surge recorded by the LPS monitor for indicating a by-pass lighting stroke. The combination of this data may thereby allow a by-pass lightning stroke to be identified, as well as provide diagnostic information about the level of damage that may have occurred. For instance, a pressure shockwave with a large amplitude above a threshold which coincides with a lower measured current below a threshold may be used to identify a significant by-pass strike. In such a scenario, a high level of energy would have been dissipated as heat and explosive force, rather than conducted through the LPS. Conversely, a measured current above a threshold coinciding with a pressure shockwave below an amplitude threshold may be used to indicate a minor by-pass strike.

In embodiments, the sensor monitor comprises a buffer for logging pressure sensor output data, and a triggering module for identifying a sensed pressure exceeding a threshold, wherein the sensor monitor generates a data output file comprising pressure sensor output data logged during a time period starting from a time before the sensed pressure exceeded the threshold to a time after the sensed pressure exceeded the threshold. As such, a triggered data storage function is provided whereby a potential by-pass lightning stroke event is identified by the pressure exceeding a threshold, and the buffer is used to generate a data file including data from the time immediately before and after the event. This thereby provides a more complete data set for subsequent analysis. In embodiments, the buffer may log pressure sensor output data for a time period of up to 1 minute before and 1 minute after the sensed pressure exceeded the threshold. More preferably, the buffer may log pressure sensor output data for a time period of up to 10 seconds before and 10 seconds after the sensed pressure exceeded the threshold.

In embodiments, the sensor monitor comprises a processor for analysing the measured current data and output from the air pressure sensor and for identifying a transient increase in air pressure coinciding with an increased measured current as a lightning generated shockwave. In this way, the apparatus may automatically identify a by-pass lightning stroke based on a shockwave detected by the sensed pressure and a strike captured by the LPS. In this way, the processor may perform active monitoring and flag events which may require maintenance investigation.

In embodiments, the sensor monitor outputs a data output to a supervisory control and data acquisition, SCADA, system. In this way, the apparatus may provide feedback for status monitoring. This may allow for remote monitoring onshore, allowing the current and pressure data to be analysed in conjunction with other data feedback systems. In other embodiments, the sensor monitor may be independent of the SCADA system, thereby facilitating easier retrofitting to existing wind turbine assemblies.

In embodiments, the mount is for mounting the air pressure sensor within one of a blade and a hub of the wind turbine blade assembly. In this way, sensor monitors may be mounted within individual blades of the blade assembly. In embodiments, a sensor may be mounted to the root of the blade. In arrangements where the interior of the blades are in fluid communication with a hollow hub, a single pressure sensor provided in the hub may allow detection of shockwaves generated in any of the blades.

In embodiments, the apparatus comprises a plurality of air pressure sensors, and a plurality of mounts for mounting respective air pressure sensors within the wind turbine blade assembly, and wherein the sensor monitor identifies a lightning generated shockwave based on the outputs from one or more of the plurality of air pressure sensors. In this way, an array of sensors may be provided for detecting shockwaves in different regions of the blade assembly.

In embodiments, at least two of the plurality of mounts are for mounting their respective air pressure sensors within different internal cavities of the wind turbine blade assembly. In this way, different sensors may be provided for detecting shockwaves in different blades and/or different internal cavities within the same blade.

According to a second aspect of the present invention, there is provided a lightning stroke diagnostic method comprising the steps of: mounting an air pressure sensor within an internal cavity of a conductive wind turbine blade assembly using a mount, the air pressure sensor for detecting an increase in air pressure within the internal cavity; monitoring an output from the air pressure sensor using a sensor monitor; receiving measured current data associated with a current conducted by a lightning protection system following a lightning stroke; and identifying a bypass lightning stroke by identifying a measured current increase coinciding with the detection of a lightning generated shockwave within the internal cavity by the air pressure sensor. In this way, a by-pass lighting stroke may be identified based on the detection of a supersonic pressure wave generated inside the hollow interior of the blade assembly, in conjunction with a measured current indicating a lightning strike.

In embodiments, the step of monitoring the output from the air pressure sensor comprises sampling the output at a sample frequency set for identifying air pressure increases associated with a supersonic pressure wave.

In embodiments, the step of monitoring the output from the air pressure sensor comprises sampling at a sample frequency of 800 Hz or higher and, preferably, at 1 kHz or higher. In preferred embodiments, the sample frequency is in the range of 10 kHz-10 MHz, and preferably is in the range of 100 kHz-1.2 MHz, or 800 kHz-1.2 MHz. At lower sampling frequencies, a sharp peak in air pressure associated with a by-pass lightning stroke may be more difficult to identify. Conversely, higher sampling frequencies require more advanced sensors and much higher datalogging speeds and storage capacity, which increases costs. Consequently, a sampling frequency of around 1 MHz is preferred.

In embodiments, the lightning stroke diagnostic method further comprises generating a data output representing air pressure over time for identifying the lightning generated shockwave.

In embodiments, the step of mounting an air pressure sensor comprises mounting a plurality of air pressure sensors using a plurality of mounts, and wherein the step of monitoring an output comprises monitoring outputs from the plurality of air pressure sensors.

In embodiments, the step of mounting the plurality of air pressure sensors comprises mounting at least two of air pressure sensors within different internal cavities of the wind turbine blade assembly.

According to an alternative aspect, there is provided wind turbine lightning stroke diagnostic apparatus comprising: a light sensor for detecting a lightning flash; a mount for mounting the light sensor within an internal cavity of a wind turbine blade assembly; and a sensor monitor configured for identifying a lightning flash within the internal cavity based on an output from the light sensor.

Illustrative embodiments of the present invention will now be described with reference to the accompanying drawings in which.

Figure 1:
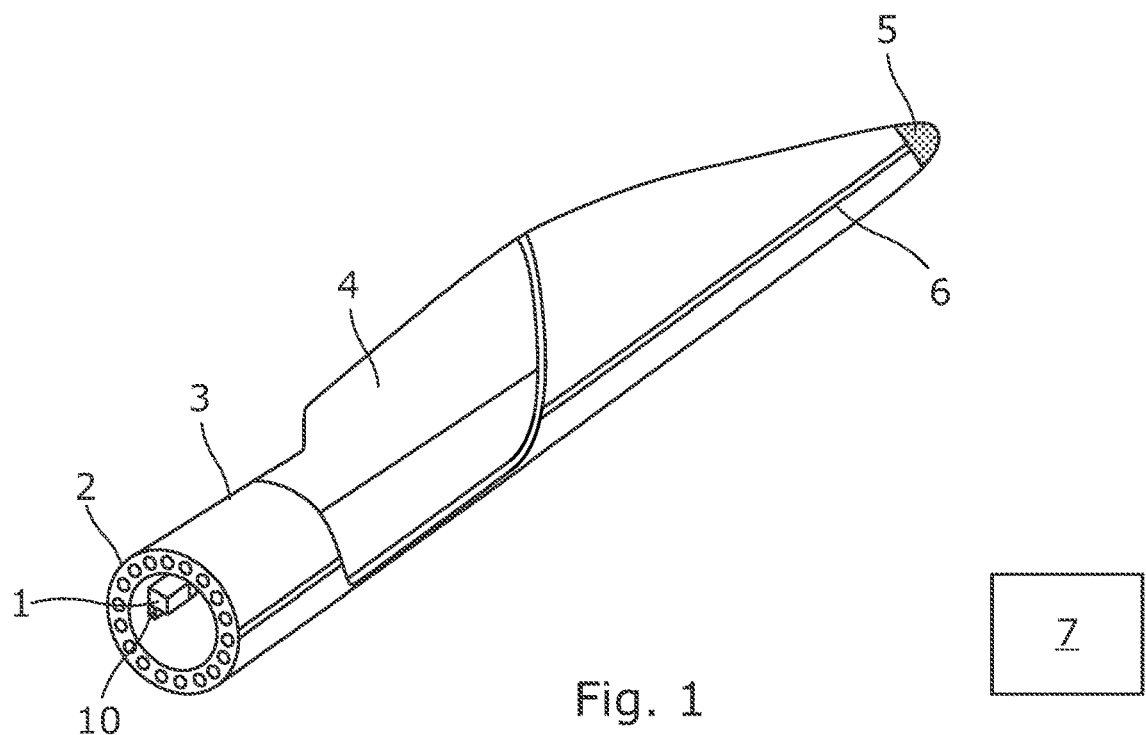
FIG. 1 shows cut away isometric view of a wind turbine blade incorporating a lightning diagnostic apparatus according to a first embodiment.

FIG. 1 shows a lightning diagnostic apparatus according to a first embodiment, when mounted to a wind turbine blade 3. The wind turbine blade 3 is a conductive blade provided as a hollow body formed of a conductive composite material, with an internal cavity 4 and a root end 2 for attachment to the rotor hub. The distal end of the blade comprises a metallic tip lightning receptor 5 which is connected to a conductive strip 6 which extends down through the blade to a grounded down-conductor and forms part of the turbine's lightning protection system (LPS). Although in this example the blade is provided with a single tip lightning receptor 5, in other LPS arrangements, a plurality of lightning receptors may be provided along the length of the blade 3.

A pressure sensor 1 is provided in the blade's internal cavity 4, and is mounted to an inner wall of the blade 3 using mounting formations 10. The pressure sensor 1 generates an output signal which is proportional to the detected air pressure within the internal cavity. The output signal is fed to a remote sensor monitor in the form of a datalogger 7, which logs the sensor readings at a preset sample frequency into a buffer. The connection between the sensor 1 and the datalogger 7 may be, for example, a wired or wireless connection. The sample frequency is set to be sufficiently high that a transient increase in pressure associated with a shockwave can be detected. In this embodiment, the sample frequency is set at 1 MHz. For context, other monitoring systems within the wind turbine will typically operate at sample frequencies that are orders of magnitude lower, often matching the turbine rotation speed of around 5-20 revolutions per minute.

In this embodiment, the datalogger 7 comprises a triggering module which activates a triggered data storage process when the sensed pressure exceeds a threshold corresponding to a minimum pressure associated with a potential by-pass generated shockwave. When the triggered data storage process is initiated, a processor within the datalogger 7 reads the previously logged values from the buffer and continues to log new values for a predetermined time period after. The logged data are then output as a data output file, such as CSV file, and consequently provides pressure data covering a time period starting from before the triggering event to a time after. In this embodiment, the data file covers a time period of 10 seconds before and 10 seconds after. The datalogger 7 is further connected to the LPS for receiving current measurement data based on the electrical current conducted through the down-conductor of the LPS following a lightning strike. This measured current data are also logged in the data output file. As such, both the measured current and pressure data are correlated over the same time periods for identifying coinciding current and pressure events.

The data output file generated by the datalogger 7 is transmitted to an onshore server for analysis using a file transfer protocol. In other embodiments, the data output file may be stored locally, or the sensor datalogger 7 may be interfaced with the wind turbine's SCADA system for centrally collating logged data with other data for analysis offshore. As part of the analysis, the pressure data may be plotted in a graph showing current and pressure over time, with this data subsequently being used in conjunction with other data for diagnostic purposes.

Figure 2:
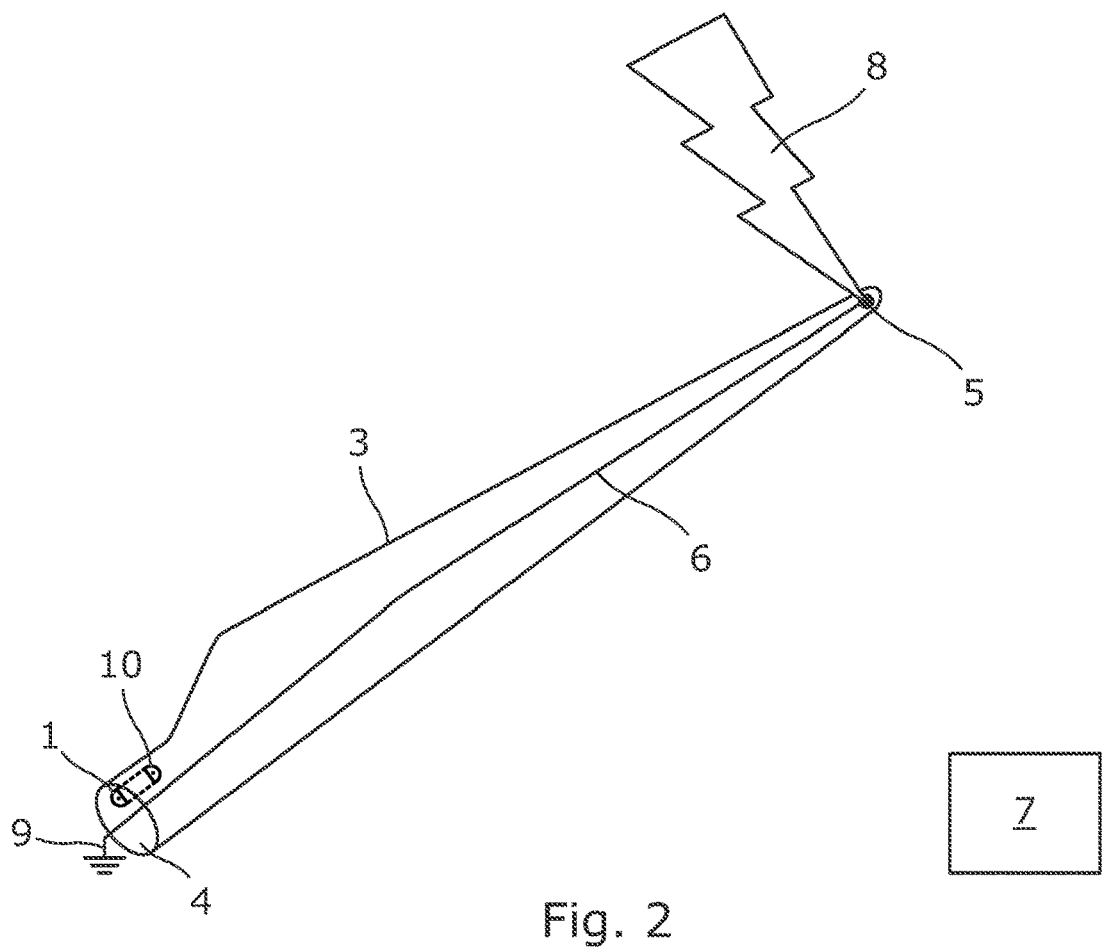
FIG. 2 shows a schematic illustration of the wind turbine blade shown in FIG. 1 when a lightning stroke hits the LPS receptor.

FIG. 2 shows a schematic illustration of the above arrangement when a lightning stroke 8 hits the tip receptor 5 on the blade 3. In this scenario, the current from the lightning stroke is conducted through the conductive strip 6 to the grounded down-conductor 9, which also serves an input for measuring the current conducted by the LPS. As such, whilst a large current will be measured by the LPS, no shockwaves are generated within the internal cavity 4 or detected by the pressure sensor 1.

Figure 3:
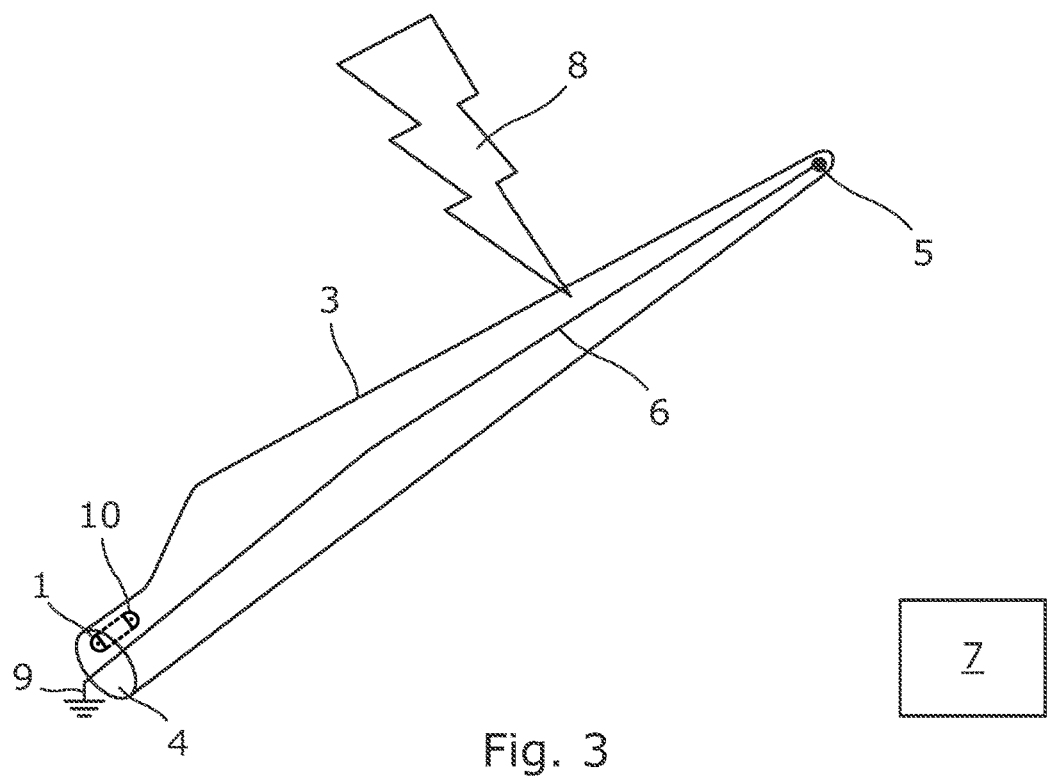
FIG. 3 shows a schematic illustration of the wind turbine blade shown in FIG. 1 when a by-pass lightning stroke occurs.

FIG. 3 shows a schematic illustration of the above arrangement when a by-pass lightning stroke occurs. In this scenario, the lightning 8 hits the blade 3 at a distance from the tip receptor 5. As such, the current is conducted in an uncontrolled manner through and over the conductive blade material, inside the blade's hollow structure, until it reaches the conductive strip 6, at which point it is then conducted through to the down-conductor 9 to ground. The uncontrolled conductions through the blade material results in arc formations at the interior surface of the blade material, which explosively heats the air leading to a pressure shockwave being generated within the internal cavity 4. The pressure shockwave travels down the internal cavity 4, where the pressure sensor 1 detects it. Although the pressure wave travels quickly over the sensor 1 and then dissipates, the sample rate of the datalogger 7 is able to log the transient increase in pressure. This data may then be output by the datalogger 7 for identifying a by-pass lightning stroke. That is, the output data will identify both sharp increase in measured current conducted through down-conductor 9, coincident with a detected pressure shock wave being detected within the internal cavity. These events will occur at substantially the same time albeit that the speed of transmission and detection of the electrical and pressure signals may be different.

Figure 4:
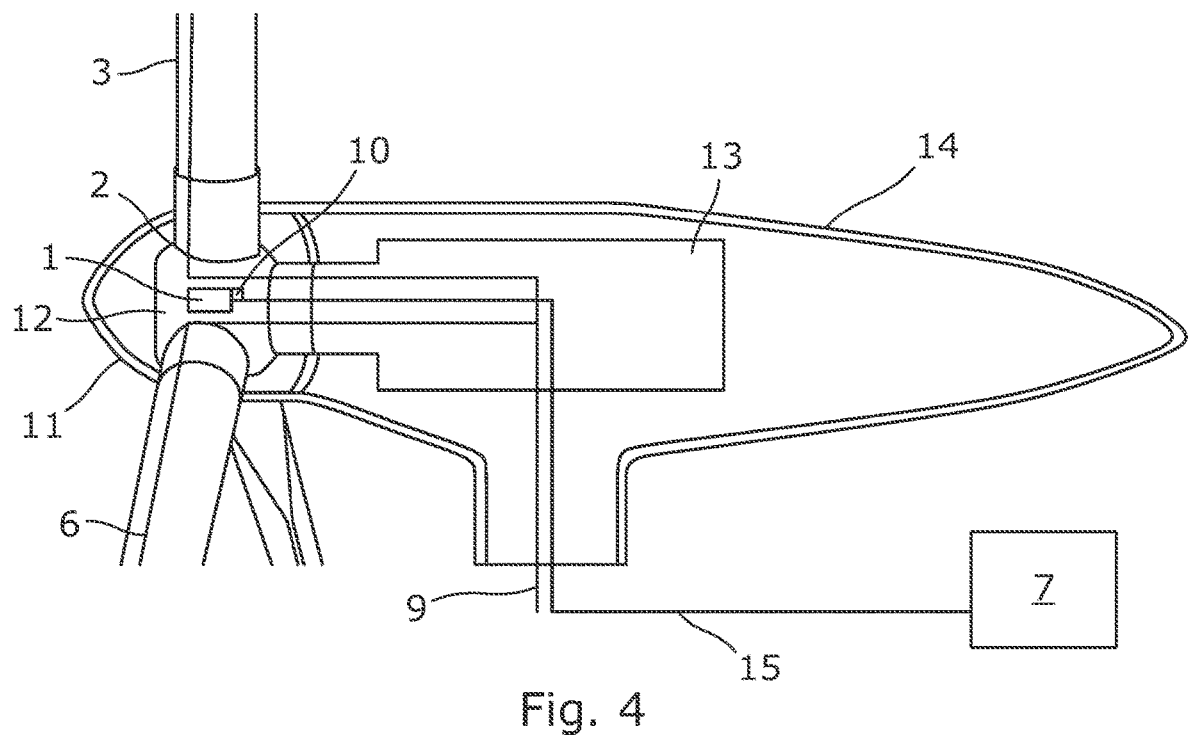
FIG. 4 shows a cross sectional view of a wind turbine nacelle and blade assembly incorporating a lightning diagnostic apparatus according to a second embodiment.

FIG. 4 shows a second embodiment of the invention. This embodiment operates in substantially the same way as the first embodiment, except that the pressure sensor 1 is incorporated into the hub 12 of the blade assembly. Specifically, the blades 3 are connected at their root 2 to the hub 12, which links the blades to the generator 13 within the wind turbine's nacelle 14. The hub 12 is provided as a hollow body that is in fluid communication with the internal cavities 4 within each of the blades 3. The pressure sensor 1 is mounted within the internal cavity of the hub 12. A hub cover 11 is provided over the front of the hub 12.

With this arrangement, a shockwave generated within any one of the blades 3 will be transmitted through the fluid communication with the hub 12 where it will be registered by the pressure sensor 1. The wired output 15 from the pressure sensor 1 is transmitted to the datalogger 7 which in turn logs the associated increase in pressure. As such, for turbine blade assemblies that have interconnected internal cavities, this arrangement may allow a single pressure sensor 1 to provide diagnostic information for the whole blade assembly.

Accordingly, with embodiments of the invention, a by-pass lighting stroke may be identified based on a measured current increase detected though the LPS system coinciding with the pressure sensor and monitor detecting a supersonic pressure wave generated inside the hollow interior of the blade assembly. That is, shockwaves arising from the uncontrolled conduction through the blade material, and between the lightning entrance point at the blade shell and the LPS down conductor, may be detected and used to identify by-pass lighting strokes. This may also provide additional diagnostic information when correlated with the LPS monitoring data to better characterise the nature of a lightning stroke and differentiate between captured strokes and by-pass strokes. For instance, a lightning stroke event which has recorded a relatively low current though the LPS monitoring system may be identified as a potentially more damaging by-pass lightning stroke based on the detection of a concurrent large pressure shockwave. The identification of a by-pass strike may then be used to prompt a maintenance operation.

It will be understood that the embodiments illustrated above show applications of the invention only for the purposes of illustration. In practice the invention may be applied to many different configurations, the detailed embodiments being straightforward for those skilled in the art to implement.

For example, although in the illustrative embodiments a single pressure sensor is shown, it will be understood that a plurality of sensors may be provided. For example, a sensor may be provided for each wind turbine blade 3. Equally, in arrangements where the wind turbine blades 3 have a plurality of cavities 4, sensors may be mounted within each cavity 4. The datalogger 7 may receive and log inputs from the plurality of sensors.

Furthermore, it will also be understood that various types of pressure sensors may be used. For example, as the frequency range of the change in air pressure associated with a by-pass lightning strike is broad, any pressure sensor capable of registering fast changes in air pressure may be used, including microphones and pressure sensitive capacitor-based sensors.

It will also be understood that various types of current measurement sensors may be used for sensing the current conducted by the LPS. For example, whilst current may be measured directly, indirect current measurements may also be measured. For example, the magnetic flux generated by the current conveyed through the LPS may be measured as a proxy for the current being conducted.

Moreover, although in the illustrative embodiments the datalogger 7 has been described as a data logger, in other embodiments, the datalogger 7 may comprise more advanced processing for analyzing the received pressure data. For example, in embodiments, the datalogger 7 may process incoming measured current and pressure sensor data in real time and trigger an alert when a by-pass strike is detected. This automatic triggering of an alert may in turn trigger other actions, such as the automatic throttling or shutdown of the wind turbine generator. For example, the diagnostic apparatus may be connected to a wind turbine controller and, if a pressure shockwave is detected above a predetermined threshold, together with a measured current increase indicating a by-pass lightning stroke, an alert generated by the diagnostic apparatus may trigger the wind turbine controller to shut down the wind turbine generator.

Further, although in the above illustrative embodiment the sensor monitor has been implemented as a datalogger sampling at a high frequency, it will be understood that other sensor monitor implementations are possible. For example, the sensor monitor may comprise a mechanical trigger which is switched by a pressure wave above a threshold associated with a by-pass lightning stroke. Triggering of the mechanical trigger may in turn generate a data entry indicating that a by-pass lightning stroke has occurred or, for example, may itself initiate the sampling of pressure measurements for detecting the remainder of the pressure wave.

Finally, it will also be understood that the diagnostic apparatus may comprise other sensors. For example, light sensors or other electromagnetic sensors may be provided for detecting electromagnetic events associated with a by-pass lightning stroke. For example, a light sensor may be provided mounted within an internal cavity for detecting the arcing associated with a bypass lightning strike. As such, the detection of light above a threshold intensity may thereby be used to determined that a by-pass lightning strike has occurred. This may be used for identifying bypass lightning strokes in conjunction with pressure sensor measurements or independently.

The invention claimed is:

1. A wind turbine lightning stroke diagnostic apparatus for a wind turbine having conductive blades, the apparatus comprising:
    a lightning protection system input for receiving measured current data associated with a current conducted by the lightning protection system following a lightning stroke;
    an air pressure sensor for detecting an increase in air pressure;
    a mount for mounting the air pressure sensor within an internal cavity of a conductive wind turbine blade assembly; and
    a sensor monitor for monitoring the measured current data and an output from the air pressure sensor and configured to identify a bypass lightning stroke when a measured current increase coincides with the detection of a lightning generated shockwave within the internal cavity by the air pressure sensor.

2. The wind turbine lightning stroke diagnostic apparatus according to claim 1, wherein the sensor monitor samples the output from the air pressure sensor at a sample frequency set for identifying air pressure increases associated with a supersonic pressure wave.

3. The wind turbine lightning stroke diagnostic apparatus according to claim 1, wherein the sensor monitor samples the output from the air pressure sensor at a sample frequency of 800 Hz to 1.2 MHz.

4. The wind turbine lightning stroke diagnostic apparatus according to claim 1, wherein the sensor monitor generates a data output representing air pressure over time for identifying the lightning generated shockwave.

5. The wind turbine lightning stroke diagnostic apparatus according to claim 1, wherein the sensor monitor comprises a processor for analysing the measured current data and output from the air pressure sensor and for identifying a transient increase in air pressure coinciding with an increased measured current as a lightning generated shockwave.

6. The wind turbine lightning stroke diagnostic apparatus according to claim 1, wherein the sensor monitor comprises a buffer for logging pressure sensor output data, and a triggering module for identifying a sensed pressure exceeding a threshold, wherein the sensor monitor generates a data output file comprising pressure sensor output data logged during a time period starting from a time before the sensed pressure exceeded the threshold to a time after the sensed pressure exceeded the threshold.

7. The wind turbine lightning stroke diagnostic apparatus according to claim 1, wherein the mount is for mounting the air pressure sensor within one of a blade and a hub of the wind turbine blade assembly.

8. The wind turbine lightning stroke diagnostic apparatus according to claim 1, wherein the apparatus comprises a plurality of air pressure sensors, and a plurality of mounts for mounting respective air pressure sensors within the wind turbine blade assembly, and wherein the sensor monitor identifies a lightning generated shockwave based on the outputs from one or more of the plurality of air pressure sensors.

9. The wind turbine lightning stroke diagnostic apparatus according to claim 8, wherein at least two of the plurality of mounts are for mounting their respective air pressure sensors within different internal cavities of the wind turbine blade assembly.

10. A lightning stroke diagnostic method comprising the steps of:

mounting an air pressure sensor within an internal cavity of a conductive wind turbine blade assembly using a mount, the air pressure sensor for detecting an increase in air pressure within the internal cavity;

monitoring an output from the air pressure sensor using a sensor monitor;

receiving measured current data associated with a current conducted by a lightning protection system following a lightning stroke; and identifying a bypass lightning stroke by identifying a measured current increase coinciding with the detection of a lightning generated shockwave within the internal cavity by the air pressure sensor.

11. The lightning stroke diagnostic method according to claim 10, wherein the step of monitoring the output from the air pressure sensor comprises sampling the output at a sample frequency set for identifying air pressure increases associated with a supersonic pressure wave.

12. The lightning stroke diagnostic method according to claim 10, wherein the step of monitoring the output from the air pressure sensor comprises sampling at a sample frequency of 800 Hz to 1.2 MHz.

13. The lightning stroke diagnostic method according to claim 10, further comprising generating a data output representing air pressure over time for identifying the lightning generated shockwave.

14. The lightning stroke diagnostic method according to claim 10, wherein the step of mounting an air pressure sensor comprises mounting a plurality of air pressure sensors using a plurality of mounts, and wherein the step of monitoring an output comprises monitoring outputs from the plurality of air pressure sensors.

15. The lightning stroke diagnostic method according to claim 14, wherein the step of mounting the plurality of air pressure sensors comprises mounting at least two of the air pressure sensors within different internal cavities of the wind turbine blade assembly.

* * * * *